(12) United States Patent
Degenstein et al.

(10) Patent No.: US 8,144,003 B2
(45) Date of Patent: Mar. 27, 2012

(54) BRAKE OR CLUTCH LINING COMPRISING A WEAR AND TEAR AND TEMPERATURE DETERMINATION UNIT

(75) Inventors: Thomas Degenstein, Mainz (DE); Erik Berger, Idstein (DE); Andreas Elvenkemper, Leverkusen (DE)

(73) Assignee: TMD Friction Services GmbH, Leverkusen (DE)

( * ) Notice: Subject to any disclaimer, the term of this patent is extended or adjusted under 35 U.S.C. 154(b) by 377 days.

(21) Appl. No.: 12/438,153

(22) PCT Filed: Aug. 18, 2007

(86) PCT No.: PCT/EP2007/007313
§ 371 (c)(1),
(2), (4) Date: Sep. 14, 2009

(87) PCT Pub. No.: WO2008/022753
PCT Pub. Date: Feb. 28, 2008

(65) Prior Publication Data
US 2010/0013620 A1    Jan. 21, 2010

(30) Foreign Application Priority Data

Aug. 23, 2006    (DE) .......................... 10 2006 039 591

(51) Int. Cl.
*B60Q 1/00*    (2006.01)
(52) U.S. Cl. ...................................................... 340/454

(58) Field of Classification Search .................. 340/454, 340/453, 588, 589; 188/1.11 W, 2 R
See application file for complete search history.

(56) References Cited

U.S. PATENT DOCUMENTS

| | | | |
|---|---|---|---|
| 3,689,880 A * | 9/1972 | McKee et al. | 340/454 |
| 3,975,706 A | 8/1976 | Kato | |
| 5,559,286 A * | 9/1996 | White et al. | 73/129 |
| 6,236,310 B1 * | 5/2001 | Kramer et al. | 340/454 |
| 6,250,430 B1 * | 6/2001 | Kyrtsos | 188/1.11 L |
| 6,446,764 B1 * | 9/2002 | Huang | 188/1.11 L |
| 6,450,300 B1 * | 9/2002 | Kramer | 188/1.11 L |
| 2004/0036592 A1 * | 2/2004 | Vertenten | 340/453 |

FOREIGN PATENT DOCUMENTS

| | | |
|---|---|---|
| DE | 2305388 | 8/1974 |
| DE | 4108622 | 9/1992 |
| DE | 4231107 | 3/1994 |
| DE | 19812554 | 5/1999 |
| DE | 10045219 | 3/2002 |
| EP | 0687828 | 12/1995 |
| WO | WO-99/57451 | 11/1999 |

* cited by examiner

*Primary Examiner* — Phung Nguyen
(74) *Attorney, Agent, or Firm* — Connolly Bove Lodge & Hutz LLP

(57) ABSTRACT

A brake or clutch lining (10; 12) has a friction lining (22) arranged on a carrier plate (20). For purposes of detecting a critical operating temperature, an electrically conductive material (24) that has a phase-transition temperature that falls within the range of the critical operating temperature of the friction lining to be detected is provided in at least one place in the friction lining (22).

18 Claims, 2 Drawing Sheets

BRAKE OR CLUTCH LINING COMPRISING A WEAR AND TEAR AND TEMPERATURE DETERMINATION UNIT

CROSS-REFERENCE TO RELATED APPLICATIONS

This application is a national stage application (under 35 U.S.C. §371) of PCT/EP2007/007313, filed Aug. 18, 2007, which claims benefit of German application 10 2006 039 591.3, filed Aug. 23, 2006.

The invention relates to a brake or clutch lining comprising a friction lining arranged on a carrier plate and comprising means to detect a critical operating temperature of the brake or clutch lining.

STATE OF THE ART

Devices that indicate wear and tear in brakes or clutches are known as such from the state of the art. They allow a critical wear boundary of a friction lining to be detected or determined before the braking or clutching action that can be achieved with this brake or clutch lining has impermissibly fallen below a minimum level.

Temperature detection units for brake linings are likewise known that provide the current temperature in the brake lining so that, on the one hand, the wear can be reliably predicted and, on the other hand, predictions can be made about the braking action as a function of the braking pressure applied between the brake lining and the brake disc.

German patent application DE 100 45 219 A1, for instance, describes a basic set-up of a multistage brake wear indicator, including a temperature detection unit for which only two electric connections are provided. A current can flow through these connections via series-connected resistors in order to determine the wear on the one hand, and to ascertain the temperature on the other hand. The occurrence of wear or a change in temperature can be deduced from a perceptible change in the electric resistance.

Furthermore, German patent application DE 100 45 219 A1 describes a discontinuous measurement and evaluation, whereby the total electric resistance determined after a braking procedure is compared to the total electric resistance that was present before this braking procedure, and then a logical evaluation is used to deduce whether part of the change in the total resistance is due to a change in the resistors used to determine the wear, on the basis of which it is ultimately possible to draw a conclusion about the temperature increase caused by the braking procedure.

Such temperature and wear detection units have a relatively complex structure. The parameters of temperature and wear that are to be ascertained are not indicated directly by the measurable electric signals, but rather can only be estimated approximately by means of a relatively laborious evaluation. The received signals relating to the temperature and state of wear are evaluated by means of intelligent software as well as via networked information stemming from the surrounding data network of the vehicle. Consequently, numerous vehicle parameters have to be ascertained and processed so that the temperature and/or wear of the brake lining can be determined.

Furthermore, very high temperatures can occur on the friction surface of the brake lining when a vehicle brake is subjected to high loads such as, for instance, when the car brakes are slammed at high speed. Sometimes, the entire friction lining can heat up to such an extent that even the adhesion layer by means of which the friction lining is attached to the carrier plate softens or else its function is severely impaired.

This can cause the friction material to detach from the lining carrier plate, thus leading to a catastrophic failure of the brakes or of the clutch lining.

SUMMARY OF THE INVENTION

Task at Hand

Therefore, the invention has the objective of detecting such a critical operating temperature in the friction lining, particularly in the vicinity of the adhesion surface, so that the driver or a control and monitoring electronic unit such as, for example, the on-board electronic system of a vehicle, can initiate the appropriate precautionary, warning or countermeasures.

The present invention is also based on the objective of allowing a simplified, precise and less expensive determination of the critical operating temperature of the friction lining.

In one refinement, the invention aims to provide means that are simple and cost-effective to realize, both for determining the critical operating temperature and for ascertaining the wear boundary of the friction lining.

THE INVENTION AND ITS ADVANTAGEOUS EFFECTS

The brake or clutch lining according to one embodiment of the invention comprises a carrier plate and a friction lining arranged on it. For purposes of detecting a critical operating temperature of the friction lining or the temperature of the adhesion layer between the friction lining and the carrier plate, an electrically conductive material is provided in at least one place in the friction lining, whereby the phase-transition temperature of said material falls within the range of the critical operating temperature of the friction lining that is to be ascertained or detected.

Preferably, the material arranged in the friction lining has a phase-transition temperature below the critical operating temperature, so that, when the friction lining heats up, for example, due to high mechanical stress, the material undergoes a phase transition that can be detected on the basis of electric signals and that can be appropriately further processed already before the operating temperature that is critical for the adhesion layer or for the friction lining is reached.

The material arranged in the friction lining is such that the phase transition that occurs at the critical operating temperature is accompanied by a change in the electric resistance of the material, or it is such that the phase transition leads to a change in the characteristics of the material that can be detected on the basis of electric signals.

As defined within the scope of the invention, the term phase transition or the accompanying phase-transition temperature refers to the qualitative change in the state of a material owing to a variation of the external conditions such as, for example, temperature, pressure, magnetic field, etc. As defined within the scope of the invention, phase transition relates particularly to changes in the aggregate state of chemical elements or substance mixtures. This especially includes the typical changes in the aggregate state and phase transitions such as melting, evaporation, sublimation, solidification, condensation or re-sublimation, but also structural phase transitions such as changes in the crystal structure, changes between ferro-magnetic and paramagnetic behavior, changes among various magnetic orders or even changes between ferroelectric and dielectric behavior.

The invention can be equally used universally in friction linings for brakes as well as in friction linings for clutches. Possible areas of application for the inventive temperature and/or wear detection in friction linings are not only disc and drum brakes but also friction clutches, disconnect-type clutches and slip clutches, especially in utility vehicles, as well as in machine tool construction and in conveying technology.

According to a first advantageous embodiment of the invention, the free ends of two electric conductors are arranged in the immediate vicinity of the material in the friction lining. These conductor ends are arranged with respect to the position and geometry of the material in such a way that the electric resistance that can be measured between the electric conductors is changed as a result of the phase transition of the material.

In this context, it is especially provided that the conductor ends are connected to each other via the electrically conductive material. Owing to a phase transition of the material, this connection between the conductor ends is interrupted, or at least affected in such manner that the resistance between the electric conductor ends changes measurably. Thus, for instance, a current flow through the two electric conductors can be interrupted or else established by means of the phase transition.

According to another embodiment of the invention, the material arranged in the friction lining melts when or before the critical operating temperature is reached. In this case, it is provided that the molten material undergoes a change in its shape caused, for example, by gravity, which results in an interruption of the electric connection between the two electric conductors.

This interruption can be easily detected and recorded by a regulating or control unit connected to the two electric conductors, so that appropriate counter-measures can immediately be initiated, for example, in the form of a display to the driver, without the need for complex signal processing.

As an alternative here, it can also be provided that, when the brake or clutch lining is in the initial state, the conductor ends do not protrude into the conductive and meltable material, but rather, that they are arranged with respect to each other in such a way that an electric connection between the conductor ends is only established once the material melts, and this connection can be detected and processed in an analogous manner by means of the electronic control unit.

Suitable materials are, for example, not only metals and alloys but also electrically conductive organic materials having a melting temperature that is suitable for the envisaged function.

According to a refinement, the brake or clutch lining is not restricted to materials that melt when or before the critical operating temperature is reached. It is also possible to employ materials that evaporate or even sublimate when or before the critical operating temperature is reached.

It is likewise advantageous for the electrically conductive material to be arranged in a housing provided in the friction lining. This housing preferably consists of non-conductive material. The two conductor ends are connected to the housing so as to protrude into it. This housing containing the meltable material can already be connected to the carrier plate or at least arranged on it before a compression or curing procedure during the production of the brake or clutch lining.

The housing contributes to effectively shielding the material incorporated into the friction lining against the mechanical stresses exerted during a compression and/or curing procedure. In this manner, an impairment of the function of the means for detecting the critical operating temperature can be largely ruled out during the production of the brake or clutch lining.

Moreover, the arrangement of the material inside a housing facilitates the assembly and also allows the modular production of the means for detecting the operating temperature. For instance, it can be prefabricated separately.

According to another aspect of the invention, a cavity is provided in the friction lining or in the housing immediately adjacent to the material. This cavity allows the outer contours and/or the geometry of the melting material to change as a result of the phase transition. If the material is present in the friction lining, for example, in the form of a solid, if the cavity is located below the material or if the conductor ends protrude into the material from above or from the side, then, when the material melts, an interruption of the electric connection occurs between the two conductor ends as a result of the change in position due to gravity as the melting material flows.

Depending on the type of material, the cavity that is adjacent to the material can be located either directly in the friction lining or else inside the housing in which the material is arranged. In this manner, the electrically conductive material, which preferably melts and flows away before the operating temperature is reached, does not fill the entire interior of a recess that has been provided for the material in the friction lining or, in a corresponding way, it does not fill the entire interior of the housing.

According to another preferred embodiment of the invention, the material is arranged directly adjacent to the lining carrier plate. Consequently, the temperature that is critical for the adhesion layer can be ascertained in a very simple and reliable manner. For this purpose, in contrast to the state of the art, there is no need for estimates or complicated evaluations of measured signals, but rather, the melting of the electrically conductive material and the accompanying change in the resistance between the electric conductors are a direct indication of the presence of a critical temperature in the brake or clutch lining or in its adhesion layer.

According to another advantageous embodiment of the invention, the material can be incorporated into the friction lining through a recess in the carrier plate. Thus, for example, the meltable material can be incorporated inside the friction lining structure from behind through the carrier plate.

This has the advantage that, on the one hand, conventional brake or clutch linings can be retrofitted with the detection unit according to the invention. On the other hand, the arrangement or the incorporation of the material into the friction lining can also be carried out by means of a compression or curing procedure during the production of the brake or clutch lining.

Since such compression or curing procedures are usually also carried out under the effect of heat; this makes it possible to avoid an impairment of the function of the material during the production of the brake or clutch lining.

According to another advantageous embodiment of the invention, at least one of the electric conductors extends to or beyond a wear boundary of the friction lining. Accordingly, this electric conductor runs between the meltable material and the wear boundary at least in certain areas parallel to the surface normal of the carrier plate or at least obliquely thereto. The other electric conductor, in contrast, preferably runs parallel to the carrier plate and preferably exits from the top or the side of the friction lining.

When the wear boundary of the friction lining is reached, the electric conductor that extends beyond the wear boundary or that at least touches it sustains mechanical damage, as a result of which the electric current flowing through the two conductors and through the material is interrupted. In this manner, simple means and just two electric contacts that project into the friction lining can reliably detect a critical temperature and ascertain that a wear boundary of the friction lining has been reached.

According to another advantageous embodiment of the invention, it is provided that two parallel-connected electric resistors are provided in the friction lining, whereby the conductor of one branch of the parallel circuit extends beyond the wear boundary of the friction lining and whereby the meltable or evaporating material is provided in the other branch of the parallel circuit. The two parallel-connected resistors have different resistances so that it can be directly and unambiguously ascertained whether the critical operating temperature or the wear boundary of the friction lining has been reached.

Accordingly, the current flow is preferably interrupted either by one or by the other branch of the parallel circuit, which leads to different measurable electric signals, depending on the resistance of the specific branch of the parallel circuit that has been interrupted.

For this purpose, the electric resistors do not necessarily have to be arranged in the friction lining. They can also be located, for example, outside of the friction lining at the appertaining branch of the parallel circuit.

EMBODIMENTS

Additional objectives, features as well as advantageous application possibilities of the present invention will be explained below on the basis of the description of embodiments making reference to the drawings. Here, all of the described and/or illustrated features, in any meaningful combination, constitute the subject matter of the present invention, also irrespective of the claims or of their referral back to other claims.

DESCRIPTION OF THE FIGURES

The following is shown.

DESCRIPTION OF THE PREFERRED EMBODIMENTS

Figures 1, 2:
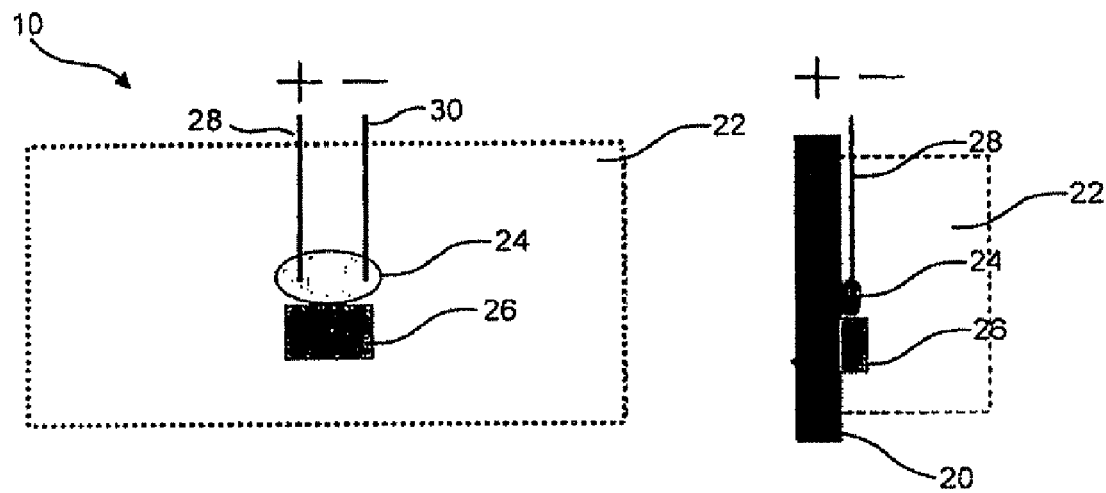
FIG. 1—a schematic depiction of the brake or clutch lining, in a top plan view.
FIG. 2—a cross section of the brake or clutch lining according to FIG. 1.

FIGS. 1 and 2 show a brake or clutch lining 10 in a schematic depiction, having a lining carrier plate 20 and a friction lining 22 arranged thereon. In the top view shown in FIG. 1, it can be clearly seen that a meltable or evaporating material 24 and a cavity 26 that is directly adjacent to it are provided in the friction lining 22.

This element 24, which has a slightly elliptical shape in FIGS. 1 and 2, and the cavity 26 located below it, come to rest directly on the carrier plate 20 and thus directly on the adhesion layer between the carrier plate 20 and the friction lining 22.

The element 24 consists of an electrically conductive material that has a phase transition within the range of a temperature that is critical for the operation of the brake or clutch. Here, it is especially provided that the material 24 melts shortly before reaching the temperature that is particularly critical for the adhesion layer and, owing to the force of gravity, flows down into the cavity 26 situated below it.

If such a melting process takes place, the electric contact between the ends of the two conductors 28 and 30 is interrupted. This interruption can be directly detected by the on-board electronic system, so that this system can autonomously initiate appropriate counter-measures and/or inform the driver of the vehicle about the critical operating state or else initiate appropriate warnings or precautionary measures.

The arrangement and geometry of the two electric conductors 28, 30 as well as of the cavity 26 and of the melting material 24 can differ from each other. Thus, it is also particularly possible for both conductors 28, 30 to be arranged so as to protrude into the cavity 26 from below, so that electric contact between the conductor ends 28, 30 is only established once the material 24 has melted and is flowing away.

It is likewise conceivable for the brake or clutch lining 10 to be configured without a cavity 26 adjacent to the meltable material 24, provided that the molten or even evaporated material 24 can escape from the area of the free ends of the two conductors 28, 30.

It is also possible for the phase transition of the material 24 that takes place at a prescribed temperature to lead to a non-sequential or discontinuous change in the electric resistance of the material 24 which, in turn, can be ascertained directly by an electronic evaluation system in a simple manner, without the need for the molten material to flow away.

Figure 3:
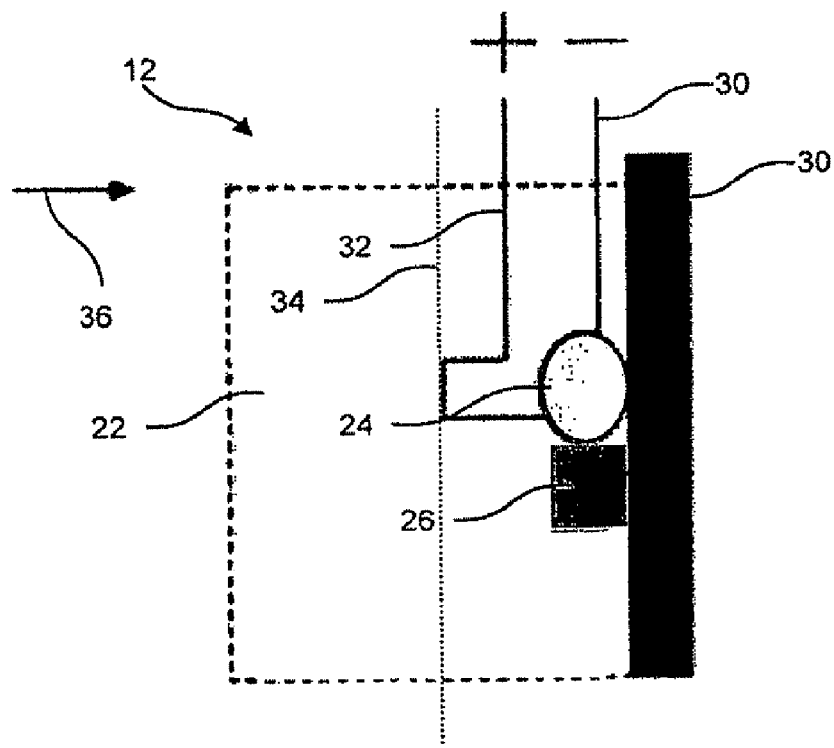
FIG. 3—a cross section of another embodiment of the brake or clutch lining for simultaneous wear and temperature detection.

FIG. 3 shows a cross sectional depiction of another embodiment which serves to determine the critical operating temperature as well as to detect a wear boundary 34 of the friction lining 22. This brake or clutch lining 12 likewise has a lining carrier plate 20 and a friction lining 22 arranged thereon. The only difference here is that the conductor 32 does not run in a straight line, but rather has a layout that extends beyond the wear boundary 34 or that is adjacent to it.

During ongoing operation of the brake or clutch, the friction lining 22 becomes increasingly worn out along the wear direction indicated by the arrow 36. Once the wear boundary 34 is reached, the electric conductor 32 is partially destroyed or abraded, as a result of which the current flowing through the conductors 32, 30 and through the melting material 24 is interrupted. A comparable current interruption occurs when, already before the wear boundary 34 is reached, the friction lining 22 heats up to such an extent that the melting material 24 melts and flows into the cavity 26.

The friction lining schematically shown in FIG. 3, using simple means, allows a precise and reliable determination of the critical operating temperature as well as the determination that the wear boundary has been reached.

Figure 4:
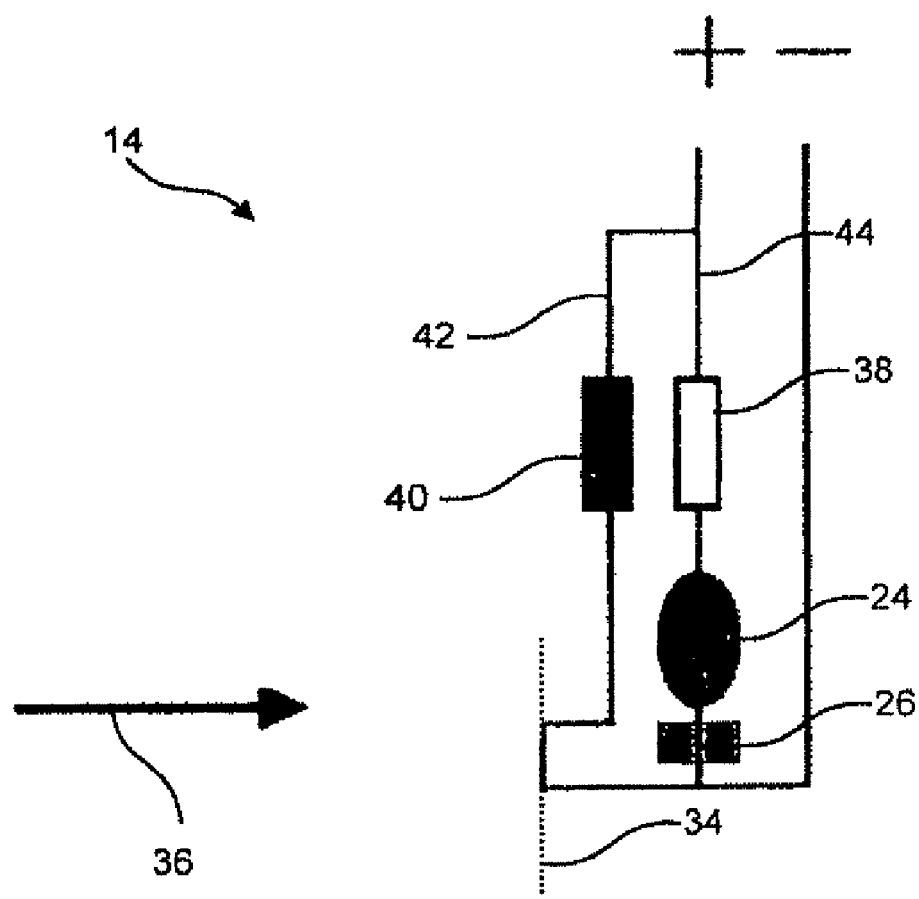
FIG. 4—a schematic depiction of a parallel current circuit to selectively ascertain wear or temperature boundaries.

The block circuit diagram 14—schematically shown in FIG. 4—of a parallel circuit that is arranged at least partially inside a friction lining 22 has two different resistors 38, 40 that allow not only a wear boundary but also a critical operating temperature to be detected separately. Thus, when the wear boundary 34 is reached, the left-hand branch 42 of the parallel circuit is interrupted so that the current flows exclusively through the resistor 38 and via the melting material 24.

In contrast, if the critical operating temperature of the brake or clutch lining is reached, the melting away of the melting material 24 causes the right-hand branch 44 of the parallel circuit to be interrupted. Since both resistors 38, 40 have different ohmic resistances, the change in the measurable electric signal can provide direct information as to whether the critical operating temperature or the wear boundary of the brake or clutch lining has been reached.

While preferred embodiments of the invention have been described and illustrated here, various changes, substitutions and modifications to the described embodiments will become apparent to those of ordinary skill in the art without thereby departing from the scope and spirit of the invention.

LIST OF REFERENCE NUMERALS 10 brake or clutch lining
12 brake or clutch lining
14 current circuit
20 lining carrier plate
22 friction lining
24 melting material
26 cavity
28 electric conductor
30 electric conductor
32 electric conductor
34 wear boundary
36 direction of wear
38 electric resistor

The invention claimed is:

1. A brake or clutch lining, comprising:
a friction lining (22) arranged on a carrier plate (20), and
means (28, 30, 24; 32) for detecting a critical operating temperature that includes an electrically conductive material (24) provided in at least one place in the friction lining, wherein said means for detecting a critical operating temperature includes two electric conductors (28, 20, 32) having ends, and the ends of the two electric conductors (28, 30, 32) are arranged in immediate vicinity of the material (24) in such a way that the electric resistance that can be measured between the electric conductors (28, 30, 32) is changed as a result of the phase transition of the material (24), and
wherein the phase-transition temperature of said electrically conductive material falls within a predetermined range of temperatures near or at the critical operating temperature.

2. The brake or clutch lining according to claim 1, characterized in that the electrically conductive material (24) melts when the critical operating temperature is reached.

3. The brake or clutch lining according to claim 1, characterized in that the electrically conductive material (24) evaporates when the critical operating temperature is reached.

4. The brake or clutch lining according to claim 1, characterized in that the electrically conductive material (24) is arranged in a housing provided in the friction lining (22).

5. The brake or clutch lining according to claim 1, characterized in that the friction lining (22) defines a cavity (26) located immediately adjacent to the electrically conductive material (24) or housing in which the electrically conductive material (24) is arranged.

6. The brake or clutch lining according to claim 1, characterized in that the electrically conductive material (24) or housing in which the electrically conductive material is held is arranged directly adjacent to the lining carrier plate (20).

7. The brake or clutch lining according to claim 1, characterized in that the carrier plate (20) defines a recess through which the electrically conductive material (24) can be inserted.

8. A method for detecting operating temperature in a brake or clutch lining, comprising:
providing a phase change material within at least one portion of a friction lining that is to be arranged on a carrier plate, wherein the phase-transition temperature of said phase change material falls within a predetermined range of temperature near or at a critical operating temperature for the brake or clutch lining;
providing conductors with portions in contact with the phase change material and forming an electrical circuit with electrical contact dependent upon the presence or absence of contact with the phase change material;
detecting an elevated temperature of the brake or clutch lining by a change in the electrical resistance between the conductors; and
signaling when the temperature of the brake or clutch lining falls within a predetermined range of temperature near or at the critical operating temperature for the brake or clutch lining.

9. The method of claim 8, further comprising:
defining a predetermined wear boundary in the friction lining;
extending at least one of the conductors to or beyond the wear boundary; and
signaling when the at least one conductor sustains mechanical damage.

10. The method of claim 9, wherein the at least one conductor extending to or beyond the wear boundary is in parallel connection with the other conductor, and each of said conductors includes a resistor having a different resistance value or has inherent resistance of different resistance values.

11. A brake or clutch lining, comprising:
a friction lining (22) arranged on a carrier plate (20), and
means (28, 30, 24; 32) for detecting a critical operating temperature that includes an electrically conductive material (24) provided in at least one place in the friction lining, wherein at least one of the means (28, 30, 24, 32) is an electrical conductor (32) that extends from the material (24) to a predetermined wear boundary (34) of the friction lining (22), and
wherein the phase-transition temperature of said electrically conductive material falls within a predetermined range of temperatures near or at the critical operating temperature.

12. The brake or clutch lining according to claim 11, characterized in that two parallel-connected electric resistors (38, 40) are provided in the friction lining (22) in a parallel circuit, whereby a conductor (42) of one branch of the parallel circuit extends at least partially to or beyond the wear boundary (34) of the friction lining (22) and the electrically conductive material (24) is arranged in a second branch (44) of the parallel circuit.

13. The brake or clutch lining according to claim 11, characterized in that the electrically conductive material (24) melts when the critical operating temperature is reached.

14. The brake or clutch lining according to claim 11, characterized in that the electrically conductive material (24) evaporates when the critical operating temperature is reached.

15. The brake or clutch lining according to claim 11, characterized in that the electrically conductive material (24) is arranged in a housing provided in the friction lining (22).

16. The brake or clutch lining according to claim 11, characterized in that the friction lining (22) defines a cavity (26) located immediately adjacent to the electrically conductive material (24) or housing in which the electrically conductive material (24) is arranged.

17. The brake or clutch lining according to claim 11, characterized in that the electrically conductive material (24) or housing in which the electrically conductive material is held is arranged directly adjacent to the lining carrier plate (20).

18. The brake or clutch lining according to claim 11, characterized in that the carrier plate (20) defines a recess through which the electrically conductive material (24) can be inserted.

* * * * *